United States Patent
Chase

(10) Patent No.: US 9,307,296 B2
(45) Date of Patent: *Apr. 5, 2016

(54) BROADCAST INTERACTIVE TELEVISION SYSTEM

(71) Applicant: AT&T Intellectual Property I, LP, Atlanta, GA (US)

(72) Inventor: Christopher J. Chase, Austin, TX (US)

(73) Assignee: AT&T INTELLECTUAL PROPERTY I, LP, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/608,587

(22) Filed: Jan. 29, 2015

(65) Prior Publication Data

US 2015/0143441 A1   May 21, 2015

Related U.S. Application Data

(63) Continuation of application No. 13/613,126, filed on Sep. 13, 2012, now Pat. No. 8,976,786, which is a continuation of application No. 12/252,178, filed on Oct. 15, 2008, now Pat. No. 8,289,978.

(51) Int. Cl.
| | |
|---|---|
| H04L 12/28 | (2006.01) |
| H04N 21/6405 | (2011.01) |
| H04L 12/18 | (2006.01) |
| H04L 12/701 | (2013.01) |
| H04L 12/761 | (2013.01) |
| H04L 12/723 | (2013.01) |

(52) U.S. Cl.
CPC ........ *H04N 21/6405* (2013.01); *H04L 12/1836* (2013.01); *H04L 45/00* (2013.01); *H04L 45/16* (2013.01); *H04L 45/50* (2013.01)

(58) Field of Classification Search
CPC ......... H04L 45/24; H04L 45/02; H04L 41/08; H04L 41/12; H04N 21/60; H04N 21/6405
See application file for complete search history.

(56) References Cited

U.S. PATENT DOCUMENTS

| | | | |
|---|---|---|---|
| 6,339,595 B1* | 1/2002 | Rekhter et al. | 370/392 |
| 6,721,318 B1* | 4/2004 | Cai et al. | 370/390 |
| 6,751,218 B1* | 6/2004 | Hagirahim et al. | 370/390 |
| 7,095,740 B1* | 8/2006 | Jagannath et al. | 370/392 |
| 7,133,928 B2* | 11/2006 | McCanne | 709/238 |
| 7,136,374 B1* | 11/2006 | Kompella | 370/352 |
| 7,283,529 B2* | 10/2007 | Basso et al. | 370/392 |
| 7,307,990 B2* | 12/2007 | Rosen et al. | 370/392 |
| 7,310,730 B1* | 12/2007 | Champagne et al. | 713/163 |
| 7,369,556 B1* | 5/2008 | Rekhter et al. | 370/392 |
| 7,519,010 B1* | 4/2009 | Aggarwal et al. | 370/254 |
| 7,525,949 B1* | 4/2009 | Rampal et al. | 370/352 |
| 7,564,806 B1* | 7/2009 | Aggarwal et al. | 370/256 |
| 7,626,995 B2* | 12/2009 | Napierala | 370/432 |
| 2001/0039623 A1* | 11/2001 | Ishikawa | 713/201 |
| 2003/0012215 A1* | 1/2003 | Novaes | 370/432 |
| 2003/0076854 A1* | 4/2003 | Mudhar et al. | 370/432 |
| 2003/0112755 A1* | 6/2003 | McDysan | 370/230 |

(Continued)

*Primary Examiner* — Pankaj Kumar
*Assistant Examiner* — Timothy Newlin
(74) *Attorney, Agent, or Firm* — Guntin & Gust, PLC; Robert Gingher

(57) ABSTRACT

A system that incorporates teachings of the present disclosure may include, for example, a system for delivering broadcast channels by way of edge routers using multicast virtual private networks, sharing a same multicast state for the broadcast channels and sharing a same multicast delivery tree for the broadcast channels. Other embodiments are disclosed.

20 Claims, 8 Drawing Sheets

200

(56) References Cited

U.S. PATENT DOCUMENTS

| | | | |
|---|---|---|---|
| 2003/0142669 A1* | 7/2003 | Kubota et al. | 370/389 |
| 2003/0163690 A1* | 8/2003 | Stewart | 713/163 |
| 2003/0191841 A1* | 10/2003 | DeFerranti et al. | 709/226 |
| 2004/0202171 A1* | 10/2004 | Hama | 370/395.1 |
| 2005/0027782 A1* | 2/2005 | Jalan et al. | 709/200 |
| 2005/0169270 A1* | 8/2005 | Mutou et al. | 370/390 |
| 2006/0147204 A1* | 7/2006 | Yasukawa et al. | 398/26 |
| 2006/0165087 A1* | 7/2006 | Page et al. | 370/395.3 |
| 2006/0187950 A1* | 8/2006 | Bou-Diab et al. | 370/432 |
| 2006/0268871 A1* | 11/2006 | Van Zijst | 370/390 |
| 2007/0025276 A1* | 2/2007 | Zwiebel et al. | 370/256 |
| 2007/0083907 A1 | 4/2007 | Serbest | |
| 2007/0097860 A1 | 5/2007 | Rys | |
| 2007/0115990 A1* | 5/2007 | Asati et al. | 370/392 |
| 2007/0147372 A1* | 6/2007 | Liu et al. | 370/390 |
| 2008/0168523 A1 | 7/2008 | Ansari | |

\* cited by examiner

500

BROADCAST INTERACTIVE TELEVISION SYSTEM

CROSS-REFERENCE TO RELATED APPLICATIONS

This application is a continuation of and claims priority to U.S. patent application Ser. No. 13/613,126, filed Sep. 13, 2012, which is a continuation of U.S. patent application Ser. No. 12/252,178 filed Oct. 15, 2008, which are incorporated herein by reference in their entirety.

FIELD OF THE DISCLOSURE

The present disclosure relates generally to interactive television (iTV) and more specifically to a broadcast iTV system.

BACKGROUND

To efficiently deliver broadcast iTV in a network of users, Internet Protocol (IP) multicast can be used. Multicast provides substantially better bandwidth efficiencies over unicast delivery. For national channels the iTV streams can be sent to local markets, independent of whether there are currently viewers in each local market for a particular channel. This is done to improve channel change time latency. To accomplish this, static joins can be created on every edge delivery router in the network across all local markets. Hundreds of channels have been made available by iTV service providers and additional channels numbering in the thousands are expected in the near future. The increase in channels is not just due to new content, but also due to variations for given content that can include channels for both standard definition resolution as well as high definition resolution. "Picture in Picture" resolution can be yet another "channel" stream. Multiple camera angles for sporting events can also add channel streams.

As more channels are added to the iTV network, the state information grows. When nodes are added to the iTV network or maintenance is performed on new nodes or links or when there are node or link failures, the time to reroute the multicast traffic depends on an amount of multicast routing states present in the network. Furthermore, pre-positioning multicast states in every local market edge router can require configuring static multicast joins in every one of the local market edge routers.

DETAILED DESCRIPTION

One embodiment of the present disclosure entails using national multicast VPNs to deliver national broadcast channels by way of IPTV edge routers using a multi-protocol label switching (MPLS) protocol and sharing a same multicast state and a same multicast delivery tree for the national broadcast channels.

Another embodiment of the present disclosure entails a computer-readable storage medium that includes computer instructions for delivering broadcast channels by way of IPTV edge routers using multicast VPNs and applying an MPLS protocol to the multicast VPNs to share a same multicast state for the broadcast channels.

Yet another embodiment of the present disclosure entails a system having a controller to deliver broadcast channels by way of interactive TV (iTV) edge routers using multicast VPNs, share a same multicast state for the broadcast channels and share a same multicast delivery tree for the broadcast channels.

Yet another embodiment of the present disclosure entails a network architecture having a plurality of multicast VPNs used to deliver broadcast channels by way of iTV edge routers and a controller adapted to cause the iTV edge routers to share a same multicast state for the broadcast channels and to share a same multicast delivery tree for the broadcast channels.

Figure 1:
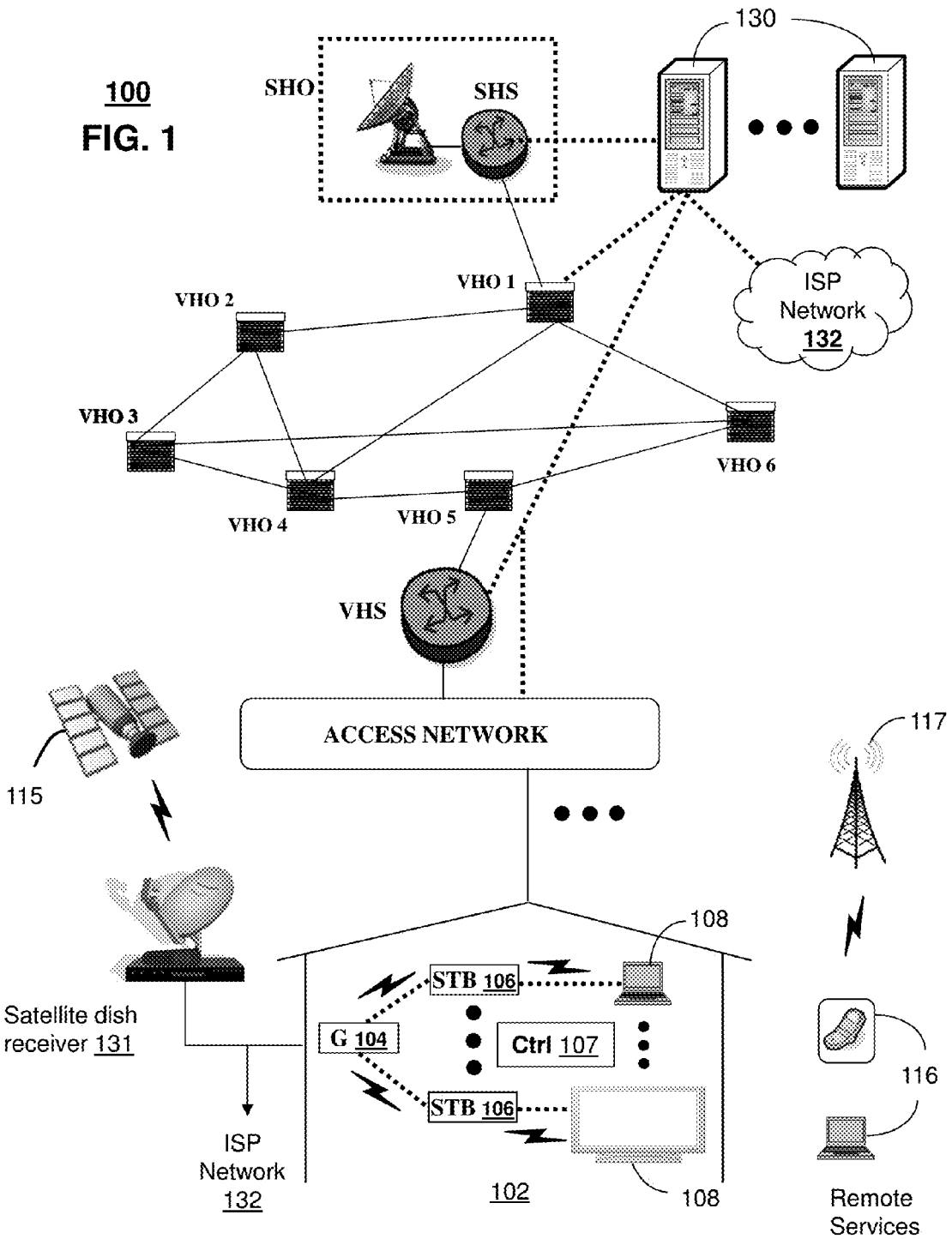
FIGS. 1-4 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via an access network to commercial and/or residential buildings 102 housing a gateway 104 (such as a residential gateway or RG). The access network can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (such as an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (such as GSM, CDMA, UMTS, WiMAX, etc.).

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
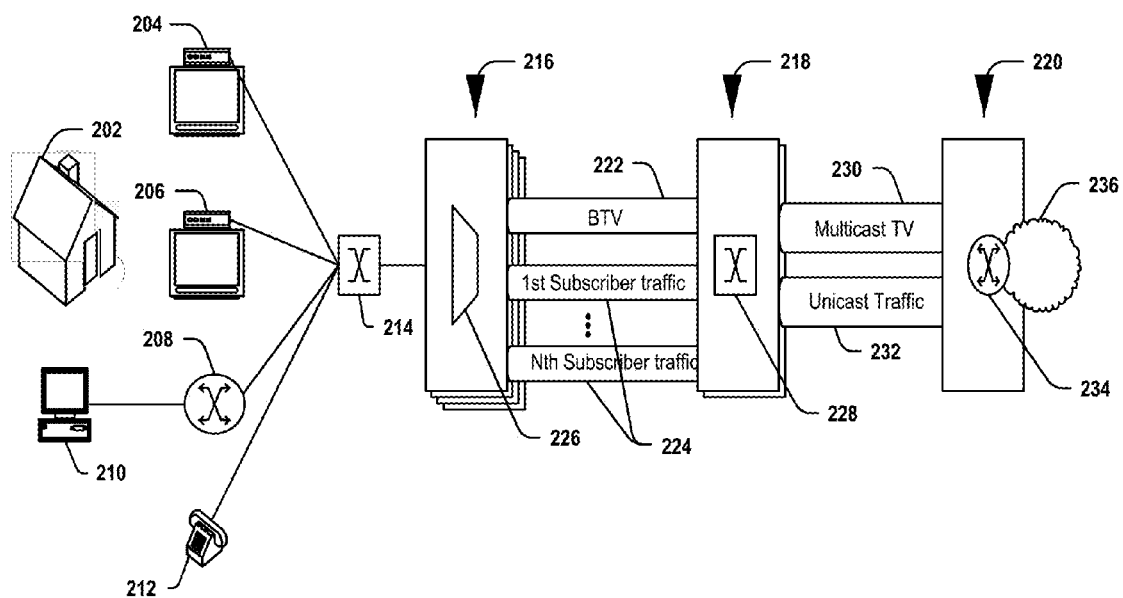

FIG. 2 depicts an illustrative embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

Figure 3:
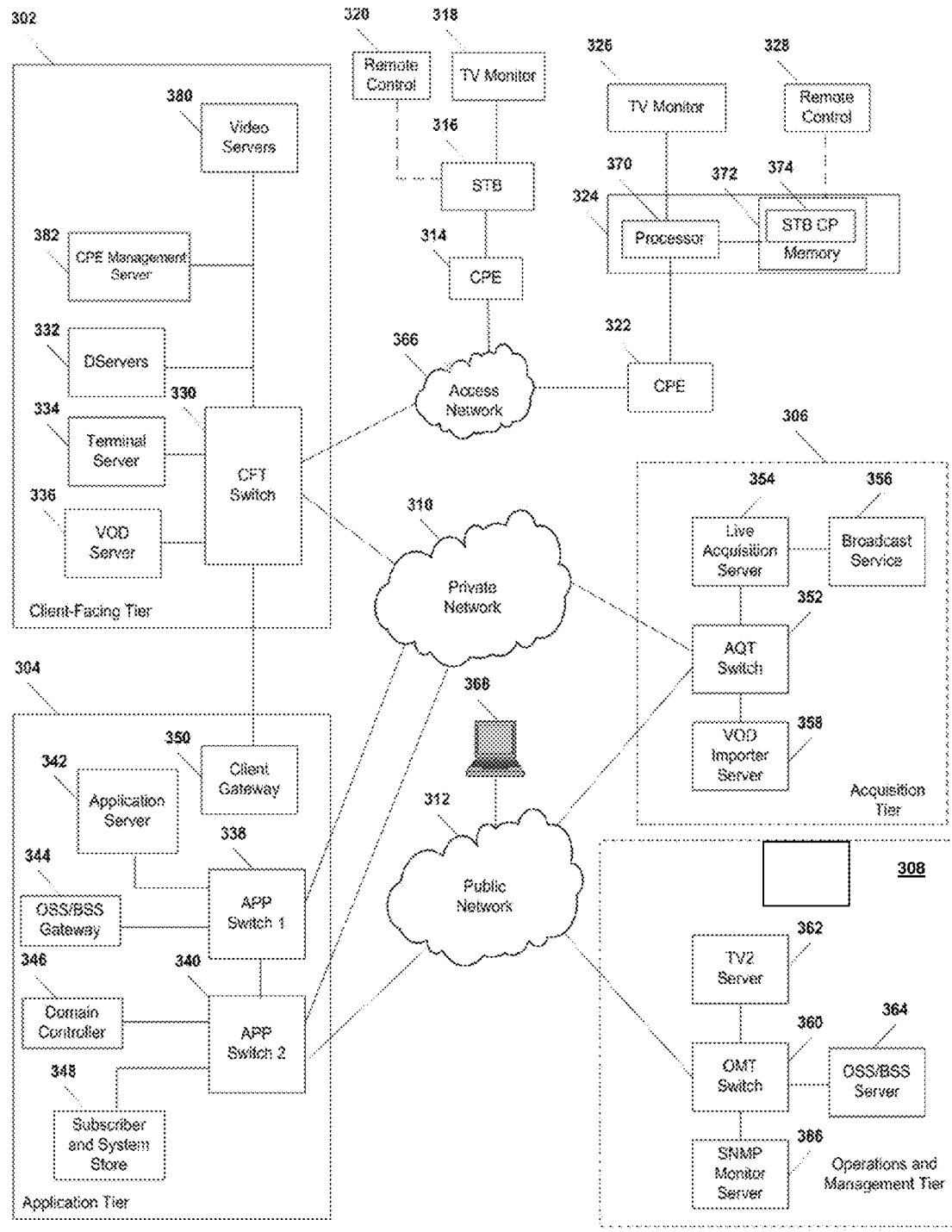

FIG. 3 depicts an illustrative embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an illustrative embodiment, the client-facing tier 302 can be coupled to the CPE 314, 322 via fiber optic cables. In another illustrative embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an illustrative, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite headend office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

It should be apparent to one of ordinary skill in the art from the foregoing media communication system embodiments that other suitable media communication systems for distributing broadcast media content as well as peer-to-peer exchange of content can be applied to the present disclosure.

Figure 4:
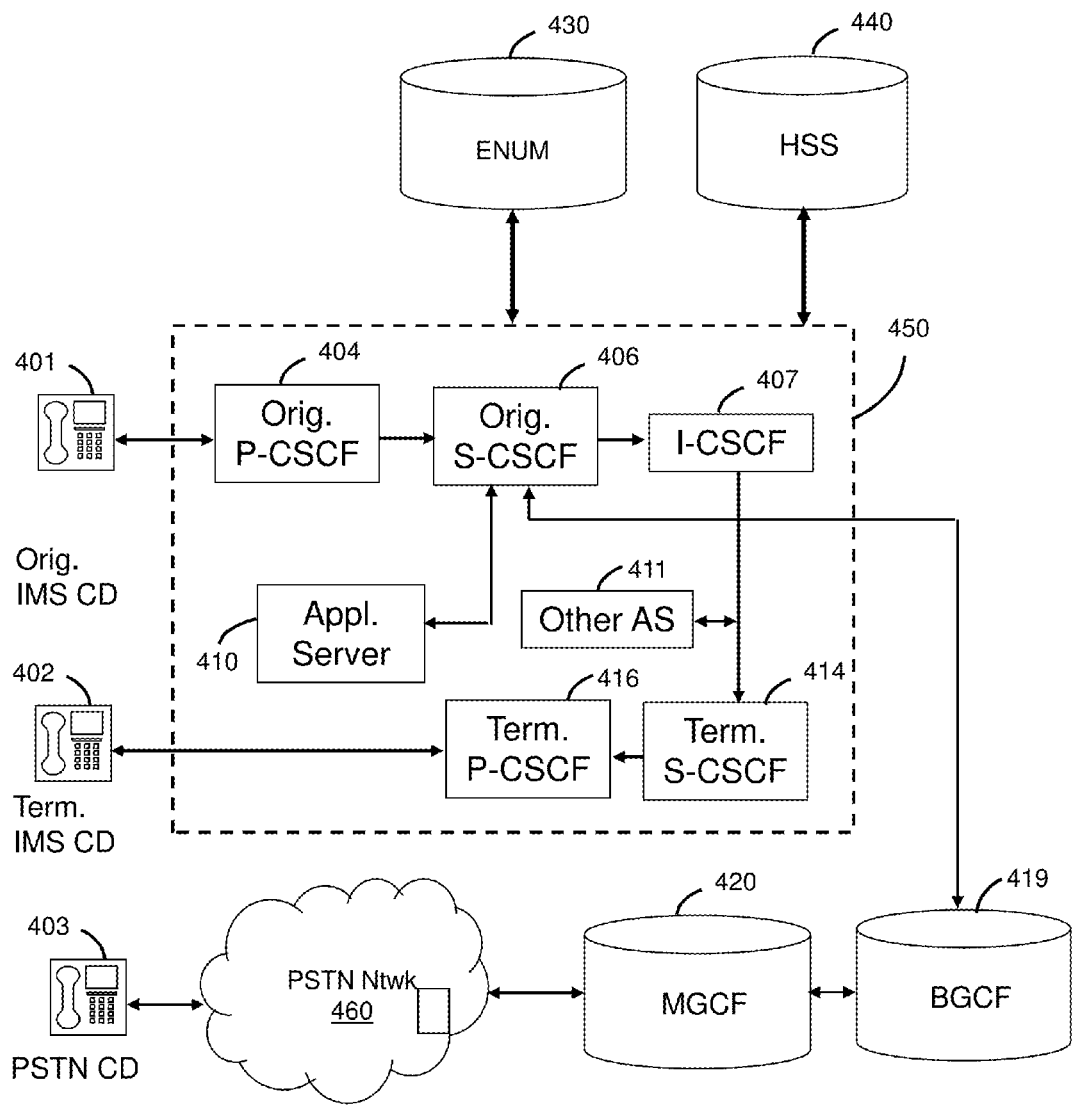

FIG. 4 depicts an illustrative embodiment of a communication system 400 employing an IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) supported by the HSS 440. To accomplish a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (such as *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

Figure 5:
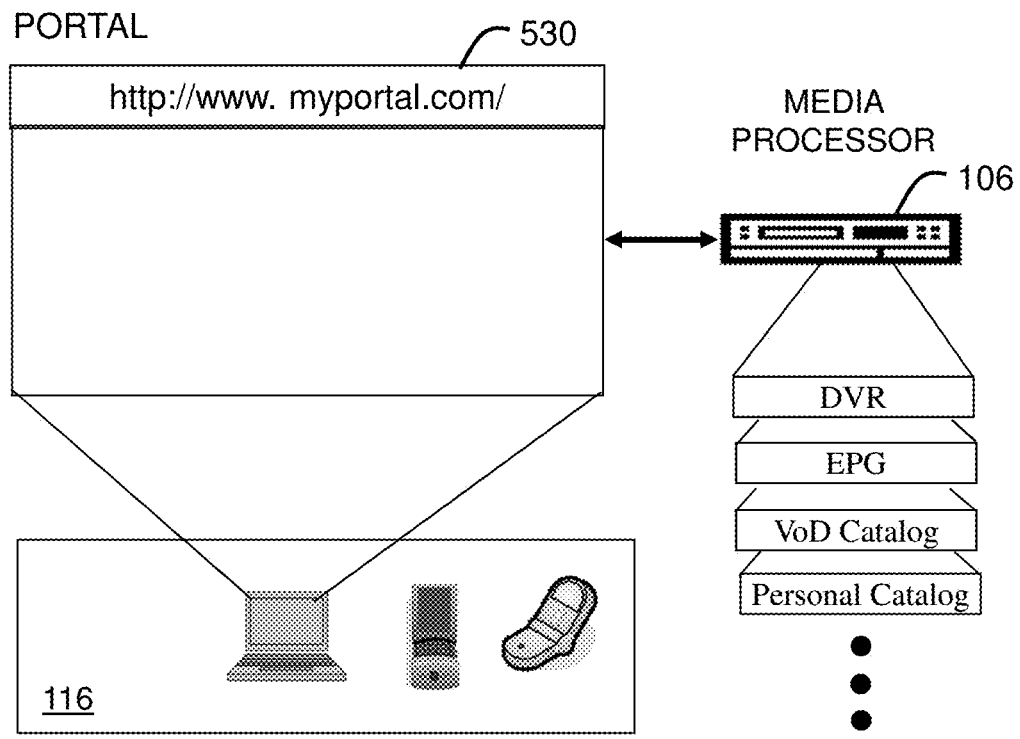
FIG. 5 depicts an illustrative embodiment of a portal interacting with at least one among the communication systems of FIGS. 1-4.

FIG. 5 depicts an illustrative embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog stored in the STB (such as personal videos, pictures, audio recordings, etc.), and so on.

Figure 6:
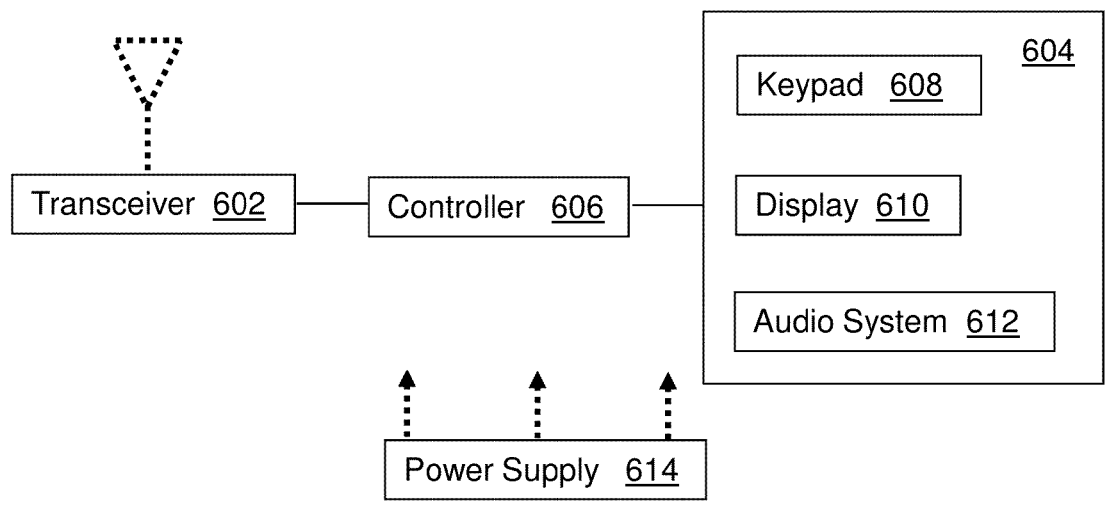
FIG. 6 depicts an illustrative embodiment of a communication device utilized in the communication systems of FIGS. 1-4.

FIG. 6 depicts an exemplary embodiment of a communication device 600. Communication device 600 can be a representative portion of any of the aforementioned communication devices of FIGS. 1-4. The communication device 604 can comprise a wireline and/or wireless transceiver 602 (herein transceiver 602), a user interface (UI) 604, a power supply 614, and a controller 606 for managing operations thereof. The transceiver 602 can support short-range or long-range wireless access technologies such as a Bluetooth wireless access protocol, a Wireless Fidelity (WiFi) access protocol, a Digital Enhanced Cordless Telecommunications (DECT) wireless access protocol, cellular, software defined radio (SDR) and/or WiMAX technologies, just to mention a few. Cellular technologies can include, for example, CDMA-1x, UMTS/HSDPA, GSM/GPRS, TDMA/EDGE, EV/DO, and next generation technologies as they arise.

The transceiver 602 can also support common wireline access technologies such as circuit-switched wireline access technologies, packet-switched wireline access technologies, or combinations thereof. PSTN can represent one of the common circuit-switched wireline access technologies. Voice over Internet Protocol (VoIP), and IP data communications can represent some of the commonly available packet-switched wireline access technologies. The transceiver 602 can also be adapted to support IP Multimedia Subsystem (IMS) protocol for interfacing to an IMS network that can combine PSTN and VoIP communication technologies.

The UI 604 can include a depressible or touch-sensitive keypad 608 and a navigation mechanism such as a roller ball, joystick, mouse, and/or navigation disk for manipulating operations of the communication device 600. The keypad 608 can be an integral part of a housing assembly of the communication device 600 or an independent device operably coupled thereto by a tethered wiring interface (such as a USB) or a wireless interface supporting for example Bluetooth. The keypad 608 can represent a numeric dialing keypad commonly used by phones, and/or a Qwerty keypad with alphanumeric keys.

The UI 604 can further include a display 610 such as monochrome or color LCD (Liquid Crystal Display), OLED (Organic Light Emitting Diode) or other suitable display technology for conveying images to the end user of the communication device 600. In an embodiment where the display 610 is touch-sensitive, a portion or all of the keypad 608 can be presented by way of the display. The UI 604 can also include an audio system 612 that utilizes common audio technology for conveying low volume audio (such as audio heard only in the proximity of a human ear) and high volume audio (such as speakerphone for hands free operation). The audio system 612 can further include a microphone for receiving audible signals of an end user.

The power supply 614 can utilize common power management technologies such as replaceable and rechargeable batteries, supply regulation technologies, and charging system technologies for supplying energy to the components of the communication device 600 to facilitate long-range or short-range portable applications. The controller 606 can utilize computing technologies such as a microprocessor and/or digital signal processor (DSP) with associated storage memory such a Flash, ROM, RAM, SRAM, DRAM or other storage technologies.

As noted above, broadcast television over IP is one service of IPTV. To efficiently deliver such broadcast TV in the network to users, IP multicast is used since it provides huge bandwidth efficiencies over unicast delivery. For national channels the IPTV streams are sent to every local market, independent of whether there are currently viewers in each local market for a particular channel. This is done to improve the channel change time latency. To accomplish this, static joins must be created on every edge delivery router in the network across all local markets. As more channels are added to the network, the state information grows. When nodes are added to the network or maintenance is performed that takes new nodes or links or when there are node or link failures, then the time to reroute the multicast traffic depends on the amount of multicast routing state present in the network.

Furthermore, pre-positioning multicast state in every local market edge router requires configuring static multicast joins in every one of the local market edge routers. This is a very large amount of configuration and it touches every router which can be an operational scale problem. The scale problem can thus occur every time new channel streams are added to the network. It is easy to miss a configuration because a node is unavailable or because of maintenance events that may remove or update configurations. Such continual activity as the number of edge elements increases leads to configuration errors and thus loss of service in the network. Such an arrangement also makes migration of the multicast delivery architecture to updated designs or new addressing difficult because of the amount of configuration that must be changed.

Using a multicast VPN to delivery national broadcast IPTV can eliminate many of the issues encountered. Multicast VPN means using a service such as MPLS VPNs that create carrier based private networks, such as a service AT&T offers to their enterprise customers. Such VPN services are used to provide isolation and privacy of individual networks and Quality of Service (QoS) for the individual customers. But contrary to the traditional goal of VPN services of providing isolation and privacy of a virtual network, the embodiments herein apply a multicast VPN service to eliminate multicast state in the backbone and eliminate the state multicast join configuration at each egress edge router in the local routers. Thus, embodiments herein can involve creating a multicast VPN across the backbone network. Every edge router (that connects to multicast clients whether caching servers or customers and to multicast sources) is treated as a provider edge (PE) router (commonly known in MPLS VPN terminology). A single VPN with a single multicast domain tree (MDT) can be created among these PE routers. In a multicast VPN, a single private multicast group can be used to create the MDT in the backbone, independent of the number of active external multicast groups. Further, every PE router can join this MDT without requiring knowledge of whether there are receivers for the multicast groups carried in the VPN. In a normal multicast VPN, the MDT creates inefficiencies by transmitting multicast packets to PE routers that may not have any receivers. However, for the broadcast IPTV application, every PE router requires that every channel be received, but such a system can eliminate the need to created static joins for each external multicast group on the PE router. Since only a single group is present in the backbone of the network, route state stays constant and convergence time is optimal. Furthermore, there is only a single VPN in the private IPTV backbone application. There are no other multicast VPNs that might contribute to state growth in this network as might be present in a retail VPN service with very large numbers and growth of customers.

Convergence for the national broadcast IPTV is constant in such a network since the multicast state is constant since only a single group is present. Also the only static multicast joins needed in the network are at the ingress PE routers where the sources are connected. No static joins are needed at the egress PE routers where the receivers are attached. Again, a problem that grows without bound and is a challenge operationally to maintain is substituted with a configuration where a single or bounded number of ingress PE routers exists.

Figure 7:
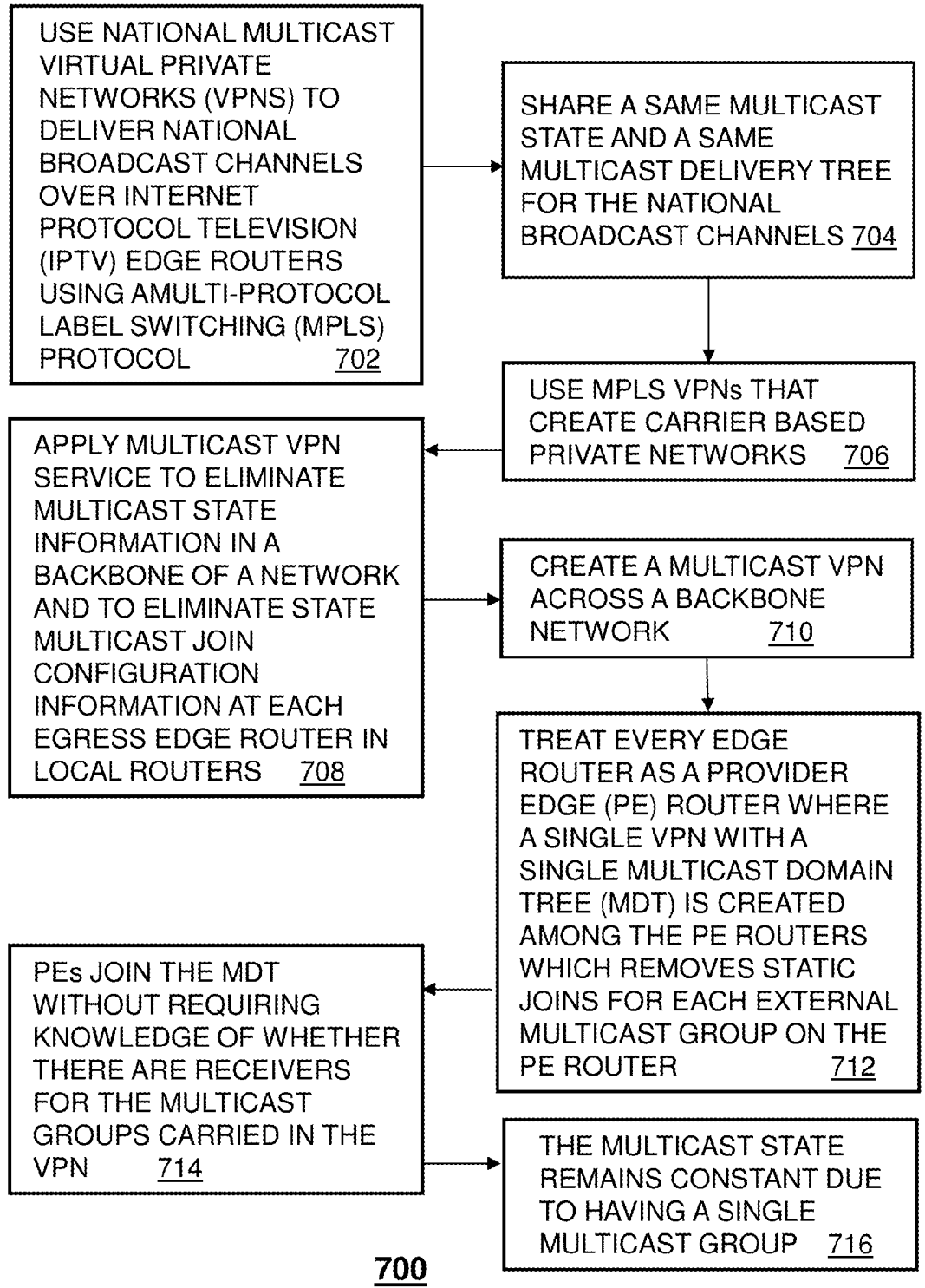
FIG. 7 depicts an illustrative embodiment of a method operating in portions of the communication systems of FIGS. 1-4.

FIG. 7 depicts an illustrative method 700 operating in portions of communication systems 100-400. Method 700 begins with step 702 in which delivery of national broadcast IPTV uses national multicast VPNs to deliver national broadcast channels by way of IPTV edge routers using an MPLS protocol and at 704 shares a same multicast state and shares a same multicast delivery tree for the national broadcast channels. At 706, the method can use MPLS VPNs that create carrier based private networks. The method can apply multicast VPN service to eliminate multicast state information in a backbone of a network and to eliminate state multicast join configuration information at each egress edge router in local routers at 708. The method 700 at 710 in this regard creates a multicast VPN across a backbone network. At 712, the method treats every edge router as a provider edge (PE) router where a single VPN with a single multicast domain tree (MDT) is created among the PE routers which eliminates static joins for each external multicast group on the PE. At 714, the PE routers can joint the MDT without requiring knowledge of whether there are receivers for the multicast groups carried in the VPN. At 716, the multicast state remains constant due to having a single multicast group. Thus, only static multicast joins are used in the network at ingress PE routers.

Upon reviewing the aforementioned embodiments, it would be evident to an artisan with ordinary skill in the art that said embodiments can be modified, reduced, or enhanced without departing from the scope and spirit of the claims described below. For example, VPNs other than MPLS VPNs can comprise the network or networks as contemplated herein.

Other suitable modifications can be applied to the present disclosure without departing from the scope of the claims below. Accordingly, the reader is directed to the claims section for a fuller understanding of the breadth and scope of the present disclosure.

Figure 8:
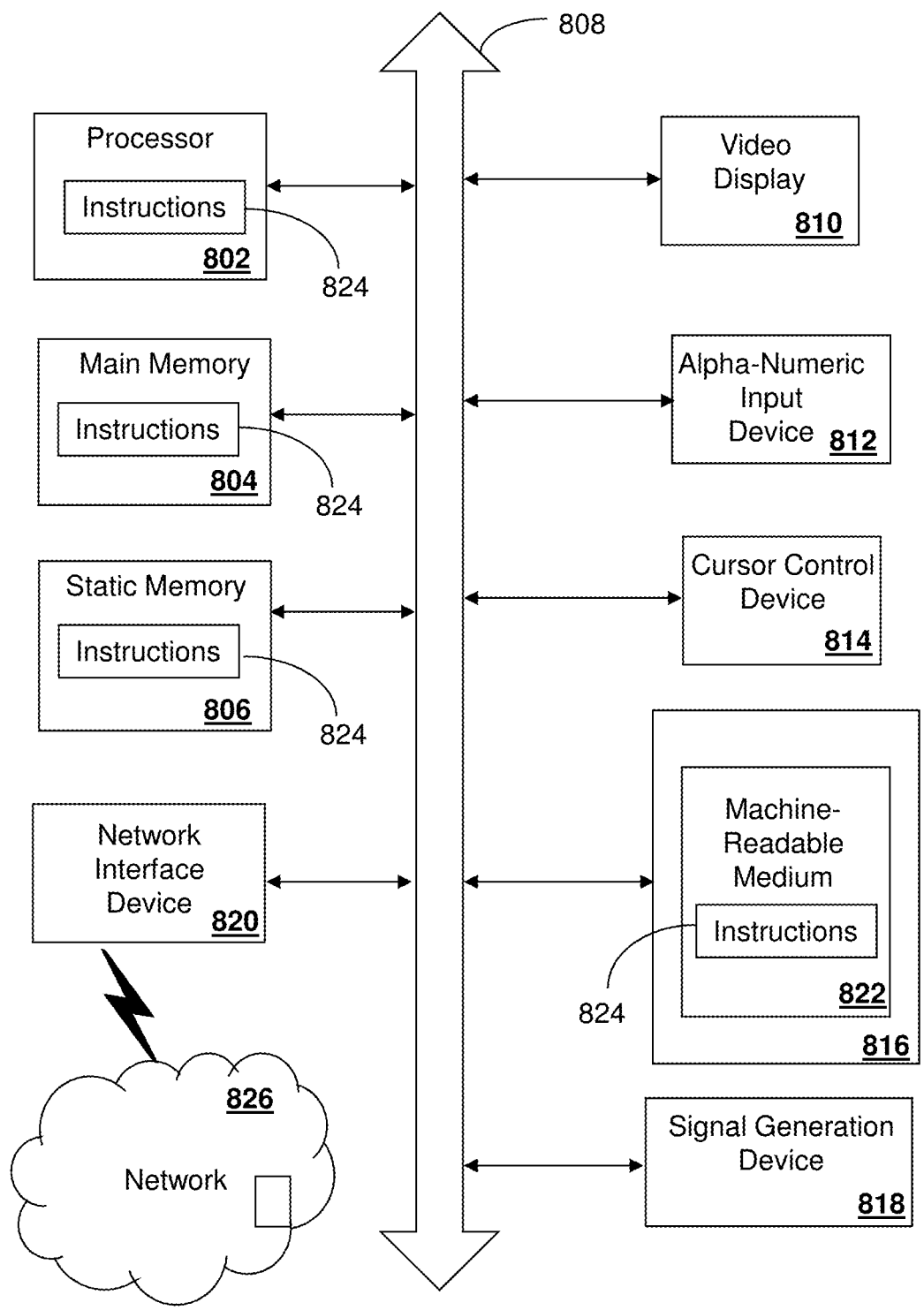
FIG. 8 is a diagrammatic representation of a machine in the form of a computer system within which a set of instructions, when executed, may cause the machine to perform any one or more of the methodologies discussed herein.

FIG. 8 depicts an illustrative diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (such as a central processing unit (CPU)), a graphics processing unit (GPU, or both), a main memory 804 and a static memory 806, which communicate with each other via a bus 808. The computer system 800 may further include a video display unit 810 (such as a liquid crystal display (LCD), a flat panel, a solid state display, or a cathode ray tube (CRT)). The computer system 800 may include an input device 812 (such as a keyboard), a cursor control device 814 (such as a mouse), a disk drive unit 816, a signal generation device 818 (such as a speaker or remote control) and a network interface device 820.

The disk drive unit 816 may include a computer-readable medium 822 on which is stored one or more sets of instructions (such as software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute computer-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the computer-readable medium 822 is shown in an example embodiment to be a single medium, the term "computer-readable medium" should be taken to include a single medium or multiple media (such as a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a computer-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (such as TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
providing, by a system comprising a processor, a first group of routers of a media system with static multicast join configuration information without providing a second group of routers of the media system with the static multicast join configuration information;
delivering, by the system, national broadcast channels via a multicast virtual private network, wherein the multicast virtual private network utilizes the first and second groups of routers to deliver the national broadcast channels;
sharing, by the system, a same multicast state and a same multicast delivery tree for the national broadcast channels; and maintaining, by the system, a static number of the first group of routers for the multicast virtual private network.

2. The method of claim 1, wherein the second group of routers includes only egress edge routers, and wherein the sharing of the same multicast state and the same multicast delivery tree is performed by transmitting multicast data via a multi-protocol label switching protocol to selected network elements.

3. The method of claim 2, wherein the first group of routers includes only ingress edge routers, and wherein the multicast virtual private network further utilizes the multi-protocol label switching protocol to deliver the national broadcast channels.

4. The method of claim 1, wherein the second group of routers join a multicast domain tree without receiving information indicating whether there are receivers for multicast groups carried in the multicast virtual private network, and wherein the sharing of the same multicast state and the same multicast delivery tree is performed by transmitting multicast data via a multi-protocol label switching protocol to selected network elements.

5. The method of claim 1, wherein the delivering of the national broadcast channels is performed by creating a single multicast domain tree among the first and second groups of routers.

6. The method of claim 5, wherein the second group of routers join the multicast domain tree without receiving information indicating whether there are receivers for multicast groups carried in the multicast virtual private network.

7. A machine-readable storage device, comprising executable instructions that, when executed by a processor, facilitate performance of operations, comprising:
delivering broadcast channels using a multicast virtual private network, wherein the multicast virtual private network utilizes a first group of networking devices provisioned with static multicast join configuration information, and wherein the multicast virtual private network utilizes a second group of networking devices that are provisioned without the static multicast join configuration information; and
applying a multi-protocol label switching protocol to the multicast virtual private network to share a same multicast state for the broadcast channels.

8. The machine-readable storage device of claim 7, wherein the operations further comprise maintaining a static number of the first group of networking devices for the multicast virtual private network.

9. The machine-readable storage device of claim 7, wherein the operations further comprise generating a single multicast domain tree among the first and second groups of networking devices.

10. The machine-readable storage device of claim 7, wherein the second group of networking devices includes only egress edge networking devices.

11. The machine-readable storage device of claim 7, wherein the second group of networking devices join a multicast domain tree without receiving information indicating whether there are receivers for multicast groups carried in the multicast virtual private network, and wherein the sharing of the multicast state is performed by transmitting multicast data via a multi-protocol label switching protocol to selected network elements.

12. The machine-readable storage device of claim 7, wherein the first and second groups of networking devices are edge networking devices.

13. The machine-readable storage device of claim 12, wherein the edge networking devices include provider edge networking devices and customer edge networking devices, and wherein a single multicast domain tree is created among the edge networking devices.

14. The machine-readable storage device of claim 13, wherein egress edge networking devices of the second group of networking devices join the single multicast domain tree without receiving information indicating whether there are receivers for multicast groups carried in the multicast virtual private network.

15. The machine-readable storage device of claim 7, wherein only static multicast joins are used in the multicast virtual private network at the first group of networking devices.

16. A system, comprising:
a processor; and
a memory that stores executable instructions that, when executed by the processor, facilitate performance of operations, comprising:
delivering broadcast content using a multicast virtual private network, wherein the multicast virtual private network utilizes a first group of network elements provisioned with static multicast join configuration information, and wherein the multicast virtual private network utilizes a second group of network elements that are provisioned without the static multicast join configuration information; and
applying a multi-protocol label switching protocol to the multicast virtual private network to share a same multicast state for the broadcast content.

17. The system of claim 16, wherein the operations further comprise:
sharing a same multicast state for the broadcast content; and
sharing a same multicast delivery tree for the broadcast content, and wherein the broadcast content is delivered by one of an internet protocol television communication system, a cable television communication system, or a satellite television communication system.

18. The system of claim 16, wherein the second group of network elements includes only egress edge network elements, and wherein the first group of network elements includes only ingress edge network elements.

19. The system of claim 16, wherein the second group of network elements join a multicast domain tree without receiving information indicating whether there are receivers for multicast groups carried in the multicast virtual private network, and wherein the sharing of the multicast state is performed by transmitting multicast data via a multi-protocol label switching protocol to selected network elements.

20. The system of claim 16, wherein the operations further comprise maintaining a static number of the first group of network elements for the multicast virtual private network, and wherein only static multicast joins are used in the multicast virtual private network at the first group of network elements.

* * * * *